United States Patent [19]

Wrege

[11] Patent Number: 4,719,399
[45] Date of Patent: Jan. 12, 1988

[54] QUICK DISCHARGE MOTOR STARTING CIRCUIT

[75] Inventor: Richard A. Wrege, Muskego, Wis.

[73] Assignee: PT Components, Inc., Milwaukee, Wis.

[21] Appl. No.: 910,932

[22] Filed: Sep. 24, 1986

[51] Int. Cl.⁴ .............................................. H02P 1/44
[52] U.S. Cl. .................................... 318/786; 318/794; 318/817
[58] Field of Search ............... 318/785, 786, 816, 817, 318/778, 794, 795; 320/1

[56] References Cited

U.S. PATENT DOCUMENTS

| | | |
|---|---|---|
| 4,604,563 | 8/1986 | Min . |
| 4,622,506 | 11/1986 | Shemanske et al. ................. 318/785 |
| 4,658,195 | 4/1987 | Min . |
| 4,664,563 | 8/1986 | Min .................................... 318/786 |
| 4,670,697 | 6/1987 | Wrege et al. . |

OTHER PUBLICATIONS

G. E. SCR Manual 4 Edition, General Electric, 1967 pp. 222-223.
Asea Bulletin B10-1112E, Sep. 1983, Edition 6.

Primary Examiner—David Smith, Jr.
Attorney, Agent, or Firm—Andrus, Sceales, Starke & Sawall

[57] ABSTRACT

A motor starting control circuit is provided with an auxiliary switch (100), including a triac (102) and series resistor (114), connected across the start capacitor (5) for quickly discharging the start capacitor (5) upon disconnection of the start capacitor (5) from the AC source (4). This enables a lower rated start switch (6) by eliminating extra voltage thereacross caused by an otherwise charged start capacitor (5).

9 Claims, 2 Drawing Figures

QUICK DISCHARGE MOTOR STARTING CIRCUIT

BACKGROUND AND SUMMARY

The invention relates to control systems for the start circuit switch of a single phase AC induction motor.

The invention particularly arose from efforts to provide a low cost start or disconnect switch, including replacement of a high cost solid state switch with a pair of lower cost SCRs in inverse parallel, though the invention is not limited thereto. A single triac conducting current in both directions is more expensive than a pair of SCRs connected in inverse parallel. Furthermore, a triac affording a higher voltage blocking capability than individual SCRs is also more expensive. The present invention reduces cost by enabling a pair of lower rated inverse parallel connected SCRs, by providing an auxiliary switch rapidly discharging the start capacitor upon turn-off of the motor start circuit when the motor reaches cut-out speed. This removes any additional voltage across the SCRs otherwise caused by the charged start capacitor, and hence allows the use of lower rated reverse breakdown SCRs and also extends the life of the start capacitor.

The invention represents continuing development and improvement over commonly owned co-pending: U.S. application Attorney Docket No. 06/910,931, filed herewith, "Low Cost, Protective Coast To Restart Circuit", Lorenz et al; U.S. application Ser. No. 06/885,087, filed July 14, 1986, "Low Cost, Load And Speed Sensitive Motor Starting Circuit", Wrege et al; and allowed U.S. application Ser. No. 680,489, filed Dec. 11, 1984, "Load And Speed Sensitive Motor Starting Circuit", Shemanske et al, all hereby incorporated herein by reference.

DETAILED DESCRIPTION

As known in the art, a single phase AC induction motor has a main winding for running the motor, and a start or auxiliary winding for starting the motor. The start circuit is energized when starting the motor from rest and then disconnected at a given motor speed. The fields in the main and auxiliary windings are phase shifted, for example by capacitance, inductance, resistance or the like, to establish a rotating magnetic field for starting and/or running torque.

Figure 1:
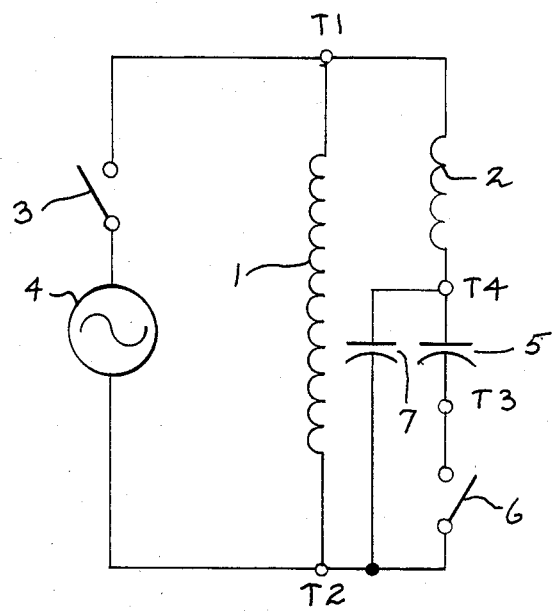
FIG. 1 schematically shows a typical environment in which the preferred embodiment of the present invention is used.

FIG. 1 shows main winding 1 and auxiliary winding 2 connectable through a main switch 3 to an AC power source 4. Capacitors 5 and 7 provide the phase shift for starting torque. When the motor reaches a given threshold cut-out speed, switch 6 is opened to disconnect start capacitor 5 from AC power source 4. Capacitor 7 is a run capacitor and provides phase shift for running torque.

Figure 2:
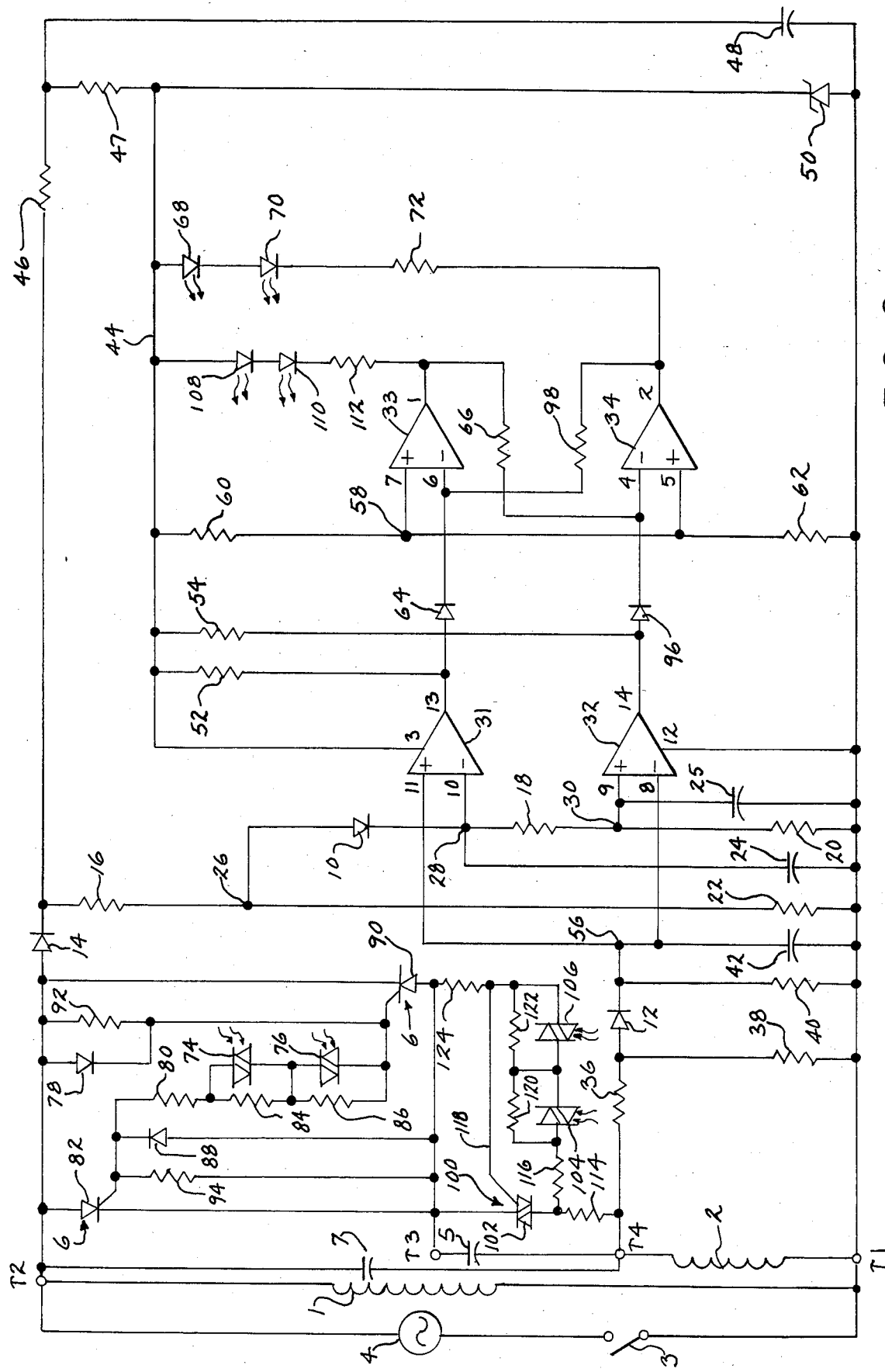
FIG. 2 is a circuit diagram illustrating circuitry constructed in accordance with the invention.

FIG. 2 shows circuitry for controlling start switch 6. A main voltage detector circuit including diode 10 is connected across main winding 1 for sensing the magnitude of the main winding voltage. Main winding voltage is sensed through rectifying diodes 14 and 10 and resistors 16, 18, 20 and 22 and filtered by capacitors 24 and 25. The voltage at node 26 is reduced by the voltage divider provided by resistor 16 on one side of the node and the parallel combination of resistor 22 and series resistors 18 and 20 on the other side of the node. The voltage at node 28 is the voltage at node 26 less the drop across diode 10. The voltage at node 30 is the voltage at node 28 reduced by the voltage divider provided by resistors 18 and 20. The voltages at nodes 28 and 30 are derived from the AC line and provide reference voltages relative thereto for the cut-out voltage comparator 31 and for the cut-in or restart voltage comparator 32, which together with third and fourth voltage comparators 33 and 34 are provided by a quad comparator chip, such as an LM339, wherein manufacturer designated pin number assignments are shown for clarity. The cut-out and cut-in reference voltages vary with the line voltage and thus provide compensation of same, and allow the cut-out speed and the cut-in restart speed of the motor to be relatively independent of line voltage. The cut-in restart speed is less than the cut-out speed. The cut-in restart voltage at node 30 is less than the cut-out voltage at node 28.

An auxiliary voltage detector circuit including diode 12 is connected across auxiliary winding 2 for sensing the magnitude of the auxiliary winding voltage. The auxiliary winding voltage is sensed through rectifying diode 12 and resistors 36, 38 and 40 and filtered by capacitor 42, for comparison by comparator 31 against the floating main winding AC line reference voltage at node 28 and for comparison by comparator 32 against the floating main winding AC line reference voltage at node 30. A half wave rectified DC power supply is provided on line 44 from the AC source through diode 14, resistors 46, 47, filtering capacitor 48 and clamping zener diode 50. A fixed twelve volt DC supply is provided at line 44 for powering the control circuitry. Resistors 52 and 54 are pull-up resistors for the outputs of the respective comparators.

As in the above noted Shemanske et al and Wrege et al applications, the circuitry in FIG. 2 utilizes the above noted quad comparator chip. As in the above noted Wrege et al application, the flip flop 21 in FIG. 4 of the above noted Shemanske et al application is eliminated, and the flip flop function is provided by a hard wire connection between the comparators, to be described.

The minus input at pin 10 of comparator 31 is used as the reference input and is connected to node 28. The plus input at pin 11 of comparator 31 is the comparing input and is connected to node 56. When the magnitude of the auxiliary winding voltage at node 56 increases to or above a predetermined cut-out value relative to the magnitude of the main winding voltage at node 28 as a function of motor speed corresponding to a given cut-out speed, the output of comparator 31 at pin 13 provides a turn-off signal by going high. Third comparator 33 has a plus input at pin 7 which is used as tne reference input and is connected to node 58 which receives a reduced voltage from line 44 divided down by the voltage divider provided by resistors 60 and 62. The minus input at pin 6 of comparator 33 is the comparing input and receives the turn-off high signal from comparator 31 through diode 64, which high signal at pin 6 causes the output of comparator 33 at pin 1 to go low. Comparator 33 compares the output of comparator 31 against the reference voltage from line 44 and outputs a low turn-off signal at pin 1 when the high turn-off signal at pin 13 rises in a given polarity direction to or above a predetermined value relative to the reference voltage at node 58 and pin 7. The low turn-off signal at pin 1 is supplied through resistor 66 to the fourth comparator 34 at pin 4 which is the minus input and is used as the comparing input for comparator 34. The plus input of comparator 34 at pin 5 is the reference input and is connected with pin 7 of comparator 33 at common node 58 and connected through the voltage divider network provided by resistors 60 and 62 to the regulated DC supply on line 44. When output pin 1 of comparator 33 goes low, the input pin 4 of comparator 34 likewise goes low, and in turn output pin 2 of comparator 34 goes high which provides a turn-off signal to switch 6, which in turn disconnects start capacitor 5 from AC source 4, to be described. Voltage comparator 34 compares at input pin 4 the output of comparator 33 against the reference voltage at pin 5 and outputs the high turn-off signal at pin 2 when the low turn-off signal from comparator 33 decreases in a given polarity direction to or below a predetermined value relative to the reference voltage at pin 5.

Switch 6 includes an optically isolated triac driver, as known in the art, for example an MOC3023, as in the above noted Shemanske et al and Wrege et al applications. Switch 6 includes SCR pair 82 and 90 connected in inverse parallel. When output pin 2 of comparator 34 goes low, current will flow through LEDs 68 and 70 through resistor 72. LEDs 68 and 70 are optically coupled to respective light responsive triacs 74 and 76 to drive the latter into conduction. When terminal T2 is positive with respect to terminal T3, current flows through diode 78, triacs 76 and 74, and resistor 80 to the gate of SCR 82 to bias the latter into conduction and conduct current from terminal T2 to terminal T3 and thus complete a circuit from AC source 4 through SCR 82 and start capacitor 5 and auxiliary winding 2. Protective resistors 84 and 86 are connected in parallel with respective triacs 74 and 76. When terminal T3 is positive with respect to terminal T2, current flows from terminal T3 through diode 88 and through resistor 80 and triacs 74 and 76 to the gate of SCR 90 to bias the latter into conduction and conduct current therethrough to complete a circuit from AC source 4 through auxiliary winding 2 and through start capacitor 5 and through SCR 90. Resistors 92 and 94 provide gate to cathode protection for respective SCRs 90 and 82. At the motor cut-out speed, output pin 2 of comparator 34 goes high, which prevents conduction through LEDs 68 and 70, which turns off light responsive triacs 74 and 76, which removes the gate drive for SCRs 82 and 90, such that the latter become nonconductive at the next respective zero crossing of the AC current, hence disconnecting start capacitor 5 from AC source 4.

Cut-in or restart comparator 32 detects a given decrease in the auxiliary winding voltage corresponding to an overload or stall condition of the motor, at which time comparator 32 generates a turn-on signal at its output pin 14 to turn on switch 6 and reconnect start capacitor 5 to AC source 4 and the auxiliary winding. The motor is automatically restarted, without manual intervention. If the motor gains speed, the magnitude of the voltage at node 56 again increases to the predetermined cut-out value relative to the voltage at node 28 as a function of motor speed corresponding to a designated cut-out speed, and switch 6 is turned off, again disconnecting start capacitor 5 from AC source 4 after reaching the cut-out speed.

When the voltage across auxiliary winding 2 at node 56 decreases to a predetermined cut-in value relative to the magnitude of the main winding voltage at node 30 as a function of motor speed corresponding to a given cut-in speed, the output of comparator 32 at pin 14 goes high and provides a turn-on signal. This turn-on signal is supplied through diode 96 to input pin 4 of comparator 34 causing the latter's output at pin 2 to go low which in turn enables conduction through LEDs 68 and 70, and hence activates triacs 74 and 76 and SCRs 82 and 90 to connect start capacitor 5 to AC source 4 and the auxiliary winding 2. The low state at output pin 2 of comparator 34 is also applied through resistor 98 to input pin 6 of comparator 33 to cause output pin 1 of the latter to go high, which high level is applied through resistor 66 to input pin 4 of comparator 34 to complete the flip flop or latching action and provide a latched condition.

Blanking interval circuitry disables the turn-on signal from comparator 34 during a blanking interval after energization of the motor to prevent immediate connection of start capacitor 5 to AC source 4 and the auxiliary winding and protect against an overcurrent condition if the motor is de-energized while in the running mode and then re-energized while still coasting above a given threshold speed. At motor speeds below the cut-out speed, connection of start capacitor 5 and start switch 6 to AC source 4 will not damage such components. After the blanking interval, the comparator circuitry samples motor speed and actuates start switch 6 to reconnect start capacitor 5 to AC source 4 and the auxiliary winding 2 only if auxiliary winding voltage has dropped to or below a given threshold value relative to main winding voltage corresponding to the noted given threshold speed. In the preferred embodiment, the threshold speed is chosen to be the cut-in speed, though other threshold speeds may of course be used up to the cut-out speed.

The blanking interval circuitry includes capacitors 25 and 42. Capacitor 25 has a capacitance substantially larger than that of capacitor 42, preferably by a factor of about ten, such that the auxiliary winding voltage at node 56 rises relatively quickly, and the rererence voltage at node 30 from the AC line rises more slowly due to the charging of the larger capacitor 25. Capacitor 24 has a capacitance substantially larger than that of capacitor 42, preferably by a factor ot about ten, such that the auxiliary winding voltage at node 56 rises relatively quickly, and the reference voltage at node 28 from the AC line rises more slowly due to the charging of the larger capacitor 24. This provides a deliberate early cross-over of the auxiliary winding voltage, i.e., the auxiliary winding voltage at node 56 rises to or above the AC line reference voltage at node 28. Input pin 11 of comparator 31 is thus high relative to input pin 10, and output pin 13 is high which in turn causes the output pin 1 of comparator 33 to be low which causes output pin 2 of comparator 34 to be high which in turn prevents conduction through LEDs 68 and 70, thus keeping SCRs 82 and 90 off. In the preferred embodiment, the SCRs are off for about 50 milliseconds when starting from rest. At the end of this blanking interval, capacitor 42 discharges sufficiently such that the voltage at node 56 falls below the voltage at node 30, and output pin 14 goes high which causes output pin 2 of comparator 34 to go low which enables conduction through LEDs 68 and 70 and in turn trigger SCRs 82 and 90 into conduction to connect start capacitor 5 to AC source 4. If starting from rest, the auxiliary winding voltage is applied from AC source 4 through run capacitor 7.

If the motor is energized while it is coasting and if at the end of the blanking interval the auxiliary winding voltage at node 56 is higher than the voltage at node 28, the motor speed is above cut-out speed, and input pin 11 is higher than input pin 10, and output pin 13 of comparator 31 will be high which in turn causes output pin 1 of comparator 33 to be low which causes output pin 2 of comparator 34 to be high and hence blocks conduction through LEDs 68 and 70, whereby SCRs 82 and 90 are off. Reconnection of start capacitor 5 to AC source 4 is thus prevented unless motor speed decreases to below the cut-in speed. At motor speeds above cut-in speed but below cut-out speed, the auxiliary winding voltage at node 56 will be higher than the voltage at node 30 and input pin 8 will be higher than input pin 9, and output pin 14 of comparator 32 will be low which in turn causes output pin 2 of comparator 34 to be high and hence blocks conduction through LEDs 68 and 70, whereby SCRs 82 and 90 are off. Reconnection of start capacitor 5 to AC source 4 is thus also prevented until motor speed decreases to below the cut-in speed, as controlled by restart cut-in comparator 32. As noted above, the given threshold speed for reconnection of start capacitor 5 after the blanking interval need not be as low as the cut-in speed, but should be less than or equal to the cut-out speed.

The blanking interval circuitry provides a time delay blanking interval after energization of the motor, whether at rest or coasting, and disables start switch 6 during the blanking interval such that start capacitor 5 is disconnected from AC source 4 during the blanking interval regardless of whether auxiliary winding voltage is above or below the threshold value. As noted above, after the blanking interval, the comparator circuitry actuates start switch 6 to reconnect start capacitor 5 to AC source 4 only if auxiliary winding voltage has dropped to or below the threshold value relative to main winding voltage, which threshold value corresponds to the noted threshold speed less than or equal to cut-out speed.

In the present invention, auxiliary switch means 100 is connected in series with resistor 114 across start capacitor 5 for quickly discharging start capacitor 5 upon disconnection of start capacitor 5 from AC source 4. Start switch 6 is conductive during the starting mode of the motor and is nonconductive during the running mode of the motor. Auxiliary switch 100 is the opposite, i.e., nonconductive during the starting mode of the motor and conductive during the running mode of the motor.

Auxiliary switch 100 is a triac 102 with light responsive triac driver trigger elements 104 and 106 in its gate circuit. The comparator circuitry has a first output terminal at pin 2 of comparator 34 providing a low turn-on signal for start switch 6 during the starting mode and conducting current through LEDs 68 and 70, and providing a high turn-off signal for start switch 6 during the running mode and preventing conduction of current through LEDs 68 and 70. The comparator circuitry has a second output terminal at pin 1 of comparator 33 providing a low signal during the noted running mode and conducting current through LEDs 108 and 110 of auxiliary switch 100, and providing a high signal during the noted starting mode and preventing conduction of current through LEDs 108 and 110 such that switch 100 is off.

When output pin 1 of comparator 33 is low, current is conducted from the DC power supply on line 44 through LEDs 108 and 110 and resistor 112. The light emitted from diodes 108 and 110 triggers light responsive triacs 104 and 106 into conduction which conduct current from charged capacitor 5 and terminal T4 through resistor 114 and resistor 116 to gate terminal 118 to bias triac 102 into conduction. Resistors 120 and 122 provide protection for respective triacs 104 and 106, and resistor 124 provides gate protection for triac 102. The low signal at output pin 1 of comparator 33 provides a turn-off signal for comparator 34 and LEDs 68, 70, and provides a turn-on signal for LEDs 108, 110.

Quick discharge of start capacitor 5 upon its disconnection from AC source 4 prevents extra voltage from being applied across start switch 6 from an otherwise charged capacitor 5. This in turn enables a lower rated start switch 6, including lower rated SCRs 82 and 90 connected in inverse parallel, which in turn affords a cost reduction over a higher rated triac for start switch 6.

It is recognized that various equivalents, alternatives and modifications are possible within the scope of tne appended claims.

I claim:

1. In a single phase AC induction motor having a main winding and an auxiliary winding both connectable to an AC power source, and having a start capacitor for providing a phase shifted field for starting torque, and having start switch means for automaticaly connecting and disconnecting said start capacitor to and from said AC source in starting and running modes, respectively, auxiliary switch means connected across said start capacitor for quickly discharging said start capacitor upon disconnection of said start capacitor from said AC source.

2. The invention according to claim 1 wherein said start switch means is conductive during said starting mode and nonconductive during said running mode, and said auxiliary switch means is nonconductive during said starting mode and conductive during said running mode.

3. The invention according to claim 2 wherein each of said start switch means and said auxiliary switch means comprises optically isolated switch means with respective LEDs for triggering said start switch means and said auxiliary switch means into conduction, and comprising control means having a first output terminal providing a turn-on signal during said starting mode and conducting current through said LED of said start switch means, and providing a turn-off signal during said running mode and preventing conduction of current through said LED of said start switch means, and having a second output terminal providing a turn-on signal for said auxiliary switch means during said running mode and conducting current through said LED of said auxiliary switch means.

4. In a single phase AC induction motor having a main winding and an auxiliary winding both connectable to an AC power source, and having a start capacitor for providing a phase shifted field for starting torque, and having start switch means for automatically connecting and disconnecting said start capacitor to and from said AC source in starting and running modes, respectively, control circuitry comprising:

auxiliary switch means connected across said start capacitor;

main voltage detector means for sensing main winding voltage;
auxiliary voltage detector means for sensing auxiliary winding voltage:
voltage comparator means comparing main and auxiliary voltages from said main and auxiliary voltage detector means and turning off said start switch means when said auxiliary winding voltage rises to a given cut-out value relative to said main winding voltage as a function of motor speed corresponding to a given cut-out speed to disconnect said start capacitor from said AC source and also turning on said auxiliary switch means to discharge said start capacitor through said auxiliary switch means.

5. The invention according to claim 4 wherein:
said start switch means comprises a pair of SCRs connected in inverse parallel and having gating circuitry including light responsive switch means optically triggered into conduction to enable gating current to flow from said AC source through said light responsive switch means to gates of said SCRs to bias the latter into conduction;
said auxiliary switch means comprises a triac connected across said start capacitor and having gating circuitry including light responsive switch means optically triggered into conduction to enable gating current to flow from a charged said start capacitor through said last mentioned light responsive switch means to the gate of said triac to bias the latter into conduction;
said start switch means further comprises light emitting means connected in circuit with said comparator means and conducting current through said light emitting means in response to a turn-on signal from said comparator means during said starting mode, such that said light emitting means emits light to said light responsive means of said gating circuitry of said SCRs such that the latter turn on and connect said start capacitor to said AC source, and such that current through said last mentioned light emitting means is blocked by a turn-off signal from said comparator means in said running mode such that said SCRs are nonconductive and disconnect said start capacitor from said AC source;
and wherein said auxiliary switch means further comprises light emitting means connected in circuit with said comparator means and conducting current through said last mentioned light emitting means in response to said second mentioned signal from said comparator means such that said last mentioned light emitting means emits light to said light responsive means in the gating circuitry of said triac such that the latter is biased into conduction and conducts current therethrough to discharge said start capacitor in said running mode, and such that current through said last mentioned light emitting means is blocked in response to said first mentioned signal from said comparator means such that said triac is nonconductive in said starting mode.

6. The invention according to claim 5 wherein said triac is connected in parallel with said start capacitor between a pair of terminals, one of said terminals being a common node connected to the anode of one of said SCRs and to the cathode of the other of said SCRs, the other terminal being connected through said light responsive switch means of said auxiliary switch means to the gate of said triac.

7. The invention according to claim 4 comprising power supply means connected to said AC source and providing a voltage biasing each of said light emitting means of said start switch means and said auxiliary switch means, and wherein said comparator means has a first output completing a circuit through said light emitting means of said start switch means from said reference voltage of said power supply means, and wherein said comparator means has a second output completing a circuit through said light emitting means of said auxiliary switch means from said voltage of said power supply means, said light emitting means of said start switch means being connected in series between said power supply means and said first output of said comparator means, said light emitting means of said auxiliary switch means being connected in series between said power supply means and said second output of said comparator means.

8. In a single phase AC induction motor having a main winding and an auxiliary winding both connectable to an AC power source, and having a start capacitor for providing a phase shifted field for starting torque, and having start switch means for automatically connecting and disconnecting said start capacitor to and from said AC source in starting and running modes, respectively, control circuitry comprising:
main voltage detector means for sensing the magnitude of main winding voltage;
auxiliary voltage detector means for sensing the magnitude of auxiliary winding voltage;
a first voltage comparator responsive to said main and auxiliary voltage detector means and comparing auxiliary winding voltage against main winding voltage and outputting a turn-off signal when the magnitude of the auxiliary winding voltage increases to a given cut-out value relative to the magnitude of the main winding voltage as a function of motor speed corresponding to a given cut-out speed;
a second voltage comparator responsive to said main and auxiliary voltage detector means and comparing auxiliary winding voltage against main winding voltage and outputting a turn-on signal when the auxiliary winding voltage decreases to a given cut-in value relative to the main winding voltage as a function of motor speed corresponding to a given cut-in speed, said given cut-in value being a stall or overload condition voltage derived from auxiliary winding voltage during running of said motor after starting, said given cut-in speed being less than said given cut-out speed;
a third voltage comparator responsive to the output of said first voltage comparator to output a turn-off signal in response to said turn-off signal from said first voltage comparator;
a fourth voltage comparator responsive to the output of said second voltage comparator and responsive to the output of said third voltage comparator, said fourth voltage comparator being responsive to said turn-off signal from said third voltage comparator to output a turn-off signal to said start switch means to disconnect said start capacitor from said AC source, said fourth voltage comparator being responsive to said turn-on signal from said second voltage comparator to output a turn-on signal to said start switch means to connect said start capacitor to said AC source;
auxiliary switch means connected across said start capacitor, said turn-off signal from said third voltage comparator to said fourth voltage comparator providing a turn-on signal for said auxiliary switch means to discharge said start capacitor.

9. The invention according to claim 8 comprising power supply means connected to said AC source and providing a reference voltage, and wherein:

said third voltage comparator compares the output of said first voltage comparator against said reference voltage and outputs a turn-off signal responsive to said turn-off signal from said first voltage comparator rising in a given polarity direction to a predetermined value relative to said reference voltage;

the output of said second voltage comparator and the output of said third voltage comparator are connected together at a common node;

said fourth voltage comparator compares the voltage at said common node against said reference voltage and outputs said turn-off signal to said start switch means when the voltage at said common node decreases in a given polarity direction to a predetermined turn-off value relative to said reference voltage, and wherein said fourth voltage comparator outputs said turn-on signal to said start switch means when the voltage at said common node increases in a given polarity direction to a predetermined turn-on value relative to said reference voltage;

the output of said fourth voltage comparator is applied to an input of said third voltage comparator which is responsive to said output of said first voltage comparator, such that said turn-on signal from said fourth voltage comparator is also applied to said third voltage comparator such that the latter outputs said turn-on signal therefrom which is applied to an input of said fourth voltage comparator which also receives said output of said second voltage comparator to ensure that said fourth voltage comparator continues to generate said turn-on signal from the output thereof, and such that said turn-off signal from said output of said fourth voltage comparator is also applied to said input of said third voltage comparator which receives said output of said first voltage comparator such that said third voltage comparator outputs said turn-off signal to said input of said fourth voltage comparator which also receives said output of said second voltage comparator and ensures that said fourth voltage comparator continues to generate said turn-off signal, to provide latching flip flop action;

said start switch means comprises optically isolated switch means with an LED connected to the output of said fourth voltage comparator;

said auxiliary switch means comprises optically isolated switch means with an LED connected to the output of said third voltage comparator.

* * * * *

UNITED STATES PATENT AND TRADEMARK OFFICE
CERTIFICATE OF CORRECTION

PATENT NO. : 4,719,399

DATED : January 12, 1988

INVENTOR(S) : RICHARD A. WREGE

It is certified that error appears in the above-identified patent and that said Letters Patent is hereby corrected as shown below:

On the Cover Page at "[56]" Delete "4,664,563 3/1986 Min........318/786".

Column 4, Line 47, Delete "ot" and substitute therefore --of--; Column 6, Line 30, Claim 1, Delete "automaticaly" and substitute therefore --automatically--; Column 7, Line 4, Claim 4, Delete ":" after "voltage" and substitute therefore --;--; Column 8, Line 23, Claim 8, Delete "torgue" and substitute therefore --torque--.

Signed and Sealed this

Fourth Day of October, 1988

*Attest:*

DONALD J. QUIGG

*Attesting Officer*  *Commissioner of Patents and Trademarks*